United States Patent [19]

Kuribayashi

[11] Patent Number: 5,324,234
[45] Date of Patent: Jun. 28, 1994

[54] SHAFT COUPLING
[75] Inventor: Sadatomo Kuribayashi, Tokyo, Japan
[73] Assignee: Kay Seven Co., Ltd., Tokyo, Japan
[21] Appl. No.: 963,140
[22] Filed: Oct. 19, 1992
[30] Foreign Application Priority Data Jul. 9, 1992 [JP] Japan .................. 4-204228

[51] Int. Cl.$^5$ .............................. F16D 3/78
[52] U.S. Cl. ...................... 464/102; 464/81; 464/104
[58] Field of Search ............ 464/81, 102, 104, 105, 464/147

[56] References Cited

U.S. PATENT DOCUMENTS

| 687,676 | 11/1901 | Culver | 464/104 |
|---|---|---|---|
| 1,514,795 | 11/1924 | Seymour . | |
| 1,574,568 | 2/1926 | Francke | 464/81 |
| 1,587,403 | 6/1926 | Nicholson | 464/81 |
| 2,612,764 | 10/1952 | Wilken | 464/147 |
| 3,038,323 | 6/1962 | Wallman | 464/85 |
| 3,312,458 | 4/1967 | Bratt | 464/81 |
| 3,905,207 | 9/1975 | Garrison | 464/72 |
| 4,335,586 | 6/1982 | Kochenedorfer et al. | 464/81 |
| 4,943,261 | 7/1990 | Smith | 464/81 X |
| 5,211,606 | 5/1993 | Simon | 464/81 X |

FOREIGN PATENT DOCUMENTS

| 0502217 | 9/1992 | European Pat. Off. . | |
|---|---|---|---|
| 524761 | 4/1931 | Fed. Rep. of Germany . | |
| 696597 | 1/1931 | France . | |
| 800627 | 7/1936 | France . | |
| 2526100 | 11/1983 | France | 464/102 |
| 9206311 | 9/1992 | PCT Int'l Appl. . | |

OTHER PUBLICATIONS

European Search Report–Date: Dec. 14, 1993; Application No. 92118120.2; Applicant: Kay Seven Co., Ltd.

Primary Examiner—Clifford D. Crowder
Assistant Examiner—John J. Calvert
Attorney, Agent, or Firm—Baker & Daniels

[57] ABSTRACT

An inner slide surface 11 at the side of the driving shaft is formed on a plastic guide member 10 at the side of the driving shaft, which is removably mounted to a thorough hole 7 of a flange 6 at the end portion 2 of the driving shaft, and an inner slide surface 13 at the side of the driven shaft is formed on a plastic guide member 12 at the side of the driven shaft, which is removably mounted to a through hole 9 of a flange 8 at the end portion 4 of the driven shaft. A metallic rod member 14 for transmitting the torque, which removably penetrates a corresponding one of the guide member at the side of the driving shaft and a corresponding one of the guide member at the side of the driven shaft, has a first outer slide surface 16 and a second outer slide 18 surface which may each slide relative to the foregoing inner slide surfaces at the side of the driving shaft and the driven shaft respectively.

A shaft coupling according to the present invention can effectively cope with the eccentricity, angular deviation and the axial movement between the driving shaft side and the driven shaft side and efficiently and smoothly transmit the torque while being easy in maintenance, repair and assembly.

8 Claims, 6 Drawing Sheets

SHAFT COUPLING

FIELD OF THE INVENTION

The present invention relates to a shaft coupling and, in particular, to a shaft coupling which is easy in repair and assembly and high in efficiency for transmitting a torque and which allows the eccentricity, angular deviation and the axial movement between the driving shaft side and the driven shaft side to be effectively coped with.

BACKGROUND OF THE INVENTION

In various mechanisms for transmitting a rotational torque, the end portions of two rotating shafts are connected by means of a coupling. For example, the output rotating shaft of a motor and the input rotating shaft of a pump are connected by means of the coupling. In this case, it takes a considerable amount of labor to carefully install the motor and the pump so that the output rotating shaft of the motor and the input rotating shaft of the pump fully align with each other. Even if the installation is carried out by paying ample attention to such an alignment, some eccentricity and angular deviation remain between both rotating shafts, and further vibrations take place to the motor or pump when they are actuated. In order to absorb these by the coupling portion, a flexible coupling using a flexible member such as a spring or rubber has conventionally been used. Further, an Oldham coupling has been used as a coupling which may cope with the eccentricity or angular deviation.

In such a shaft coupling, in general, a proper mount member is respectively mounted at the end portion of the driving shaft and the driven shaft to couple them by means of a proper mechanism.

SUMMARY OF THE INVENTION

An object of the present invention is to provide a novel shaft coupling easy in repair and assembly and which can effectively cope with the eccentricity, angular deviation and the axial movement between the driving shaft side and the driven shaft side. Another object of the present invention is to provide a shaft coupling which transmit the torque efficiently. A still another object of the present invention is to provide a shaft coupling having the foregoing novel construction and which may transmit the torque smoothly and is easy in maintenance.

According to the present invention, in order to achieve the foregoing end, there is provided a shaft coupling in which:

the end portion of a driving shaft and the end portion of a driven shaft are disposed in an opposed manner;

on the end portion of the driving shaft, a flange is attached, at which a plurality of through holes running parallel to the rotational axis of the driving shaft is arrayed in the circumferential direction, to which a guide member at the side of the driving shaft is removably mounted, on which a pair of inner slide surfaces running parallel to each other is formed;

on the end portion of the driven shaft, a flange is attached, at which a plurality of through holes running parallel to the rotational axis of the driven shaft is arrayed in the circumferential direction, to which a guide member at the side of the driven shaft is removably mounted, on which a pair of inner slide surfaces running parallel to each other is formed; and a plurality of torque transmitting rod members are mounted so as to penetrate corresponding ones of the guide member at the side of the driving shaft and the guide member at the side of the driven shaft in the direction of the rotational axis of the driving shaft or in the direction of the rotational axis of the driven shaft, the rod member having a pair of first outer slide surfaces slidable along the pair of inner slide surfaces at the side of the driving shaft and a pair of second outer slide surfaces slidable along the pair of inner slide surfaces at the side of the driven shaft and not parallel to the first outer slide surfaces, the rod member being removable in the direction of the rotational axis of the driving shaft or in the direction of the rotational axis of the driven shaft relative to the guide member at the side of the driving shaft and the guide member at the side of the driven shaft.

In the present invention, preferably, the angle which the first outer slide surface and second outer slide surface of the rod member form with a plane which passes through the rotational axes of the driving shaft or the driven shaft and through the rod member is set to approximately the same angle (in particular, 45 degrees) for all rod members.

In one embodiment of the present invention, a flange portion attached to the guide member at the side of the driving shaft is made to abut the outer circumferential surface of the end portion of the driving shaft to set the direction in which the inner slide surface at the side of the driving shaft extends while a flange portion attached to the guide member at the side of the driven shaft is made to abut the outer circumferential surface of the end portion of the driven shaft to set the direction in which the inner slide surface at the side of the driven shaft extends.

In another embodiment of the present invention, the first outer slide surface and the second outer slide surface of the rod member are made of metal, and the inner slide surface at the side of the driving shaft for the guide member at the side of the driving shaft and the inner slide surface at the side of the driven shaft for the guide member at the side of the driven shaft are made of plastic.

Further, in a still another embodiment of the present invention, the first outer slide surface and the second outer slide surface of the rod member intersect at a right angle with each other. Here, the cross section of the rod member within a plane which intersects the longitudinal direction at a right angle can be of square form. In addition, the first outer slide surface and the second outer slide surface of the rod member is arranged so that they may form an angle of about 45 degrees relative to the plane passing through the rotational axis of the driving shaft or the driven shaft and through the rod member.

DESCRIPTION OF THE PREFERRED EMBODIMENTS

A specific embodiment of the present invention is hereinafter described with reference to the accompanying drawings.

Figure 1:
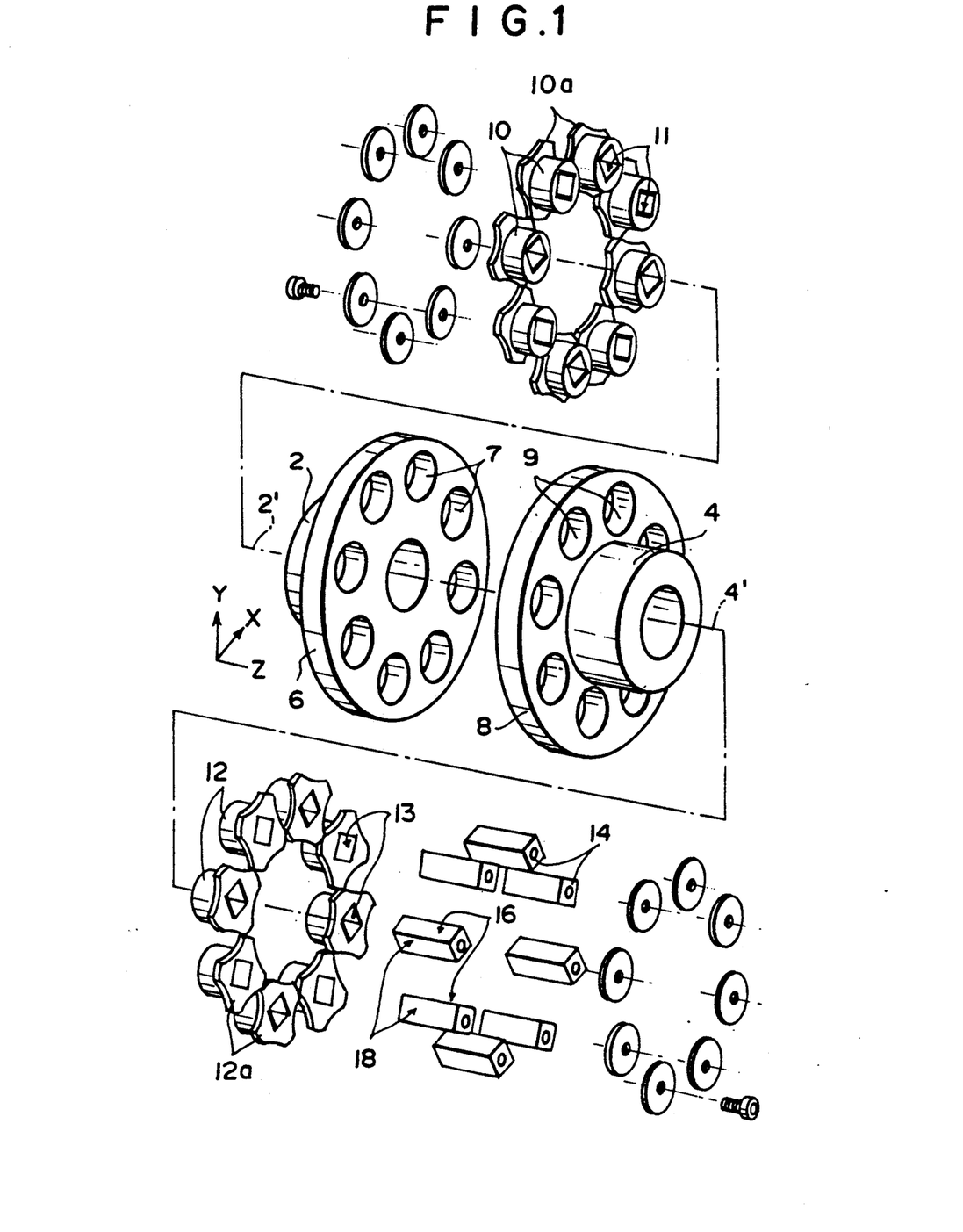
FIG. 1 is an exploded perspective view of a specific embodiment of the shaft coupling according to the present invention.
Figure 2:
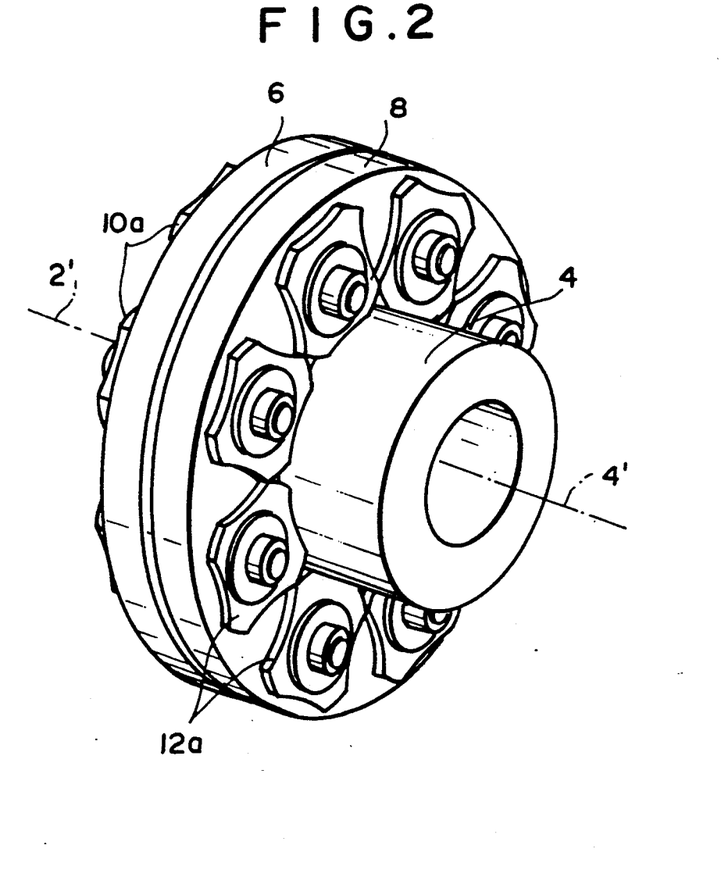
FIG. 2 is a perspective view of the assembled shaft coupling of FIG. 1.
Figure 3:
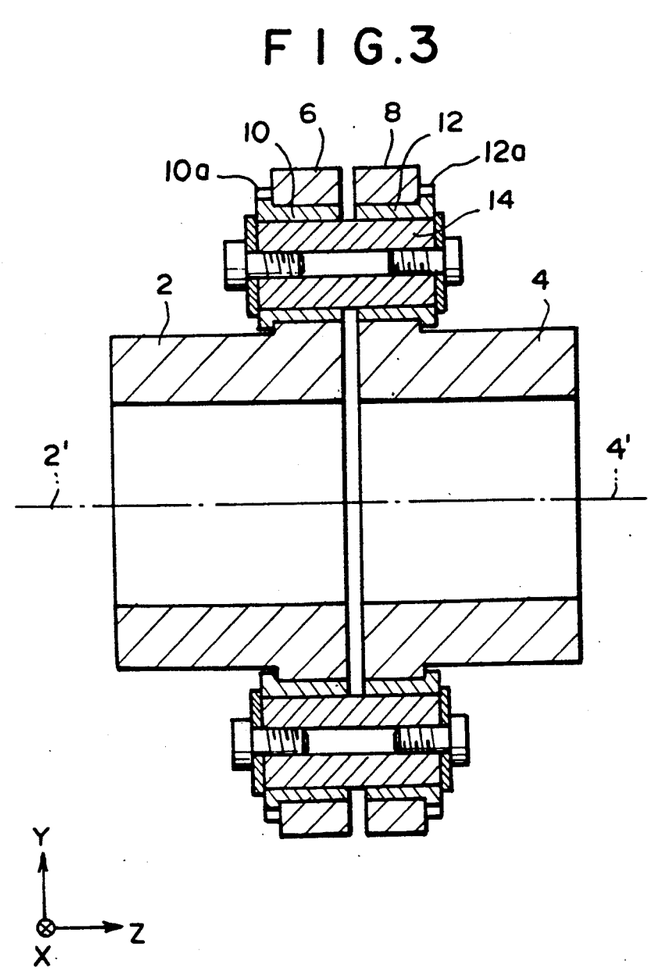
FIG. 3 is a cross-sectional view of the assembled shaft coupling of FIG. 1.
Figure 4:
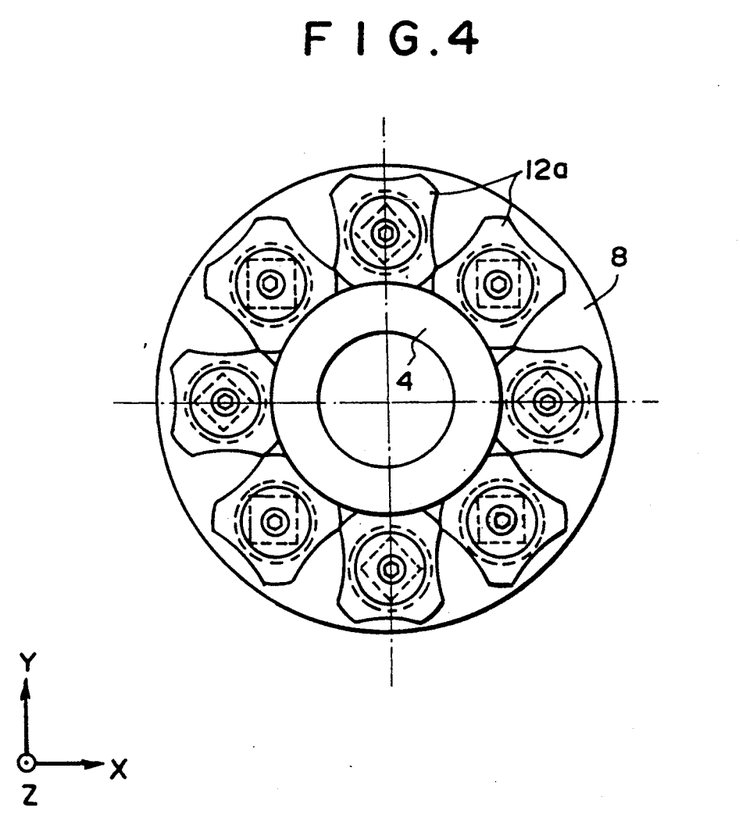
FIG. 4 is a view of the shaft coupling of FIG. 1 as viewed from the driven shaft side.

FIG. 1 is an exploded perspective view of a specific embodiment of the shaft coupling according to the present invention. FIG. 2 is a perspective view thereof when assembled. FIG. 3 is a cross-sectional view thereof. FIG. 4 is a view thereof as viewed from the driven shaft side in the Z direction. In these figures, 2 denotes the end potion of the driving shaft, and 2' the rotational axis of the driving shaft. Further, 4 denotes the end portion of the driven shaft, and 4' the rotational axis of the driven shaft. The end portion 2 of the driving shaft and the end portion 4 of the driven shaft are each disposed in an opposed manner so that their rotational axes 2', 4' align with each other in the Z direction.

On the end surface of the end portion 2 of the driving shaft, a flange 6 is attached, through which eight through holes 7 uniformly arrayed about the rotational axis 2' of the driving shaft in the circumferential direction are formed, within which a guide member 10 at the side of the driving shaft is inserted toward the driven side in the direction parallel to the rotational axis 2' of the driving shaft. Through each guide member 10 at the side of the driving shaft, a through hole of rectangular cross section is formed in parallel to the rotational axis 2' of the driving shaft, and two opposed inner surfaces of the through hole serve as the inner slide surface 11 at the side of the driving shaft. The inner slide surface 11 alternately has the same orientation in the circumferential array of the guide member 10 at the side of the driving shaft, and has an orientation offset 45 degrees from each other between the adjacent guide members 10 at the side of the driving shaft.

Further, on the end surface of the end portion 4 of the driven shaft, a flange 8 is attached, through which eight through holes 9 uniformly arrayed about the rotational axis 4' of the driven shaft in the circumferential direction are formed (the number of the through holes 9 is the same as that of the through holes 7 formed through the flange 6 at the end portion of the driving shaft). Through the through holes, a guide member 12 at the side of the driven shaft is each inserted toward the driving side in the direction parallel to the rotational axis 4' of the driven shaft. Through each guide member 12 at the side of the driven shaft, a through hole of rectangular cross section is formed in parallel to the rotational axis 4' of the driven shaft, and two opposed inner surfaces of the through hole correspond to the inner slide surface 13 at the side of the driven shaft, which alternately has the same orientation in the circumferential array of the guide member at the side of the driven shaft while having an orientation offset 45 degrees from each other between the adjacent guide members 12 at the side of the driven shaft.

A torque transmitting rod member 14 penetrates corresponding ones of the through holes of the guide member 10 at the side of the driving shaft and the through holes of the guide member 12 at the side of the driven shaft in the Z direction. As shown, with both end portions of each rod member 14, a bolt is engaged via a washer, so that each rod member 14 can be shifted in the Z direction over a proper stroke while being prevented from dropping from the guide member 10 at the side of the driving shaft and the guide member 12 at the side of the driven shaft. Each rod member 14 is of rectangular cross section, and of its four lateral surfaces, a pair of opposed ones corresponds to a first outer slide surface 16 fitting with the foregoing inner slide surface 11 of the guide member at the side of the driving shaft, while the other pair of opposed ones corresponds to a second outer slide surface 18 fitting with the foregoing inner slide surface 13 of the guide member at the side of the driven shaft.

As shown in FIGS. 1, 2 and 4, at the guide member 10 at the side of the driving shaft and at the guide member 12 at the side of the driven shaft, flange portions 10a and 12a are respectively formed, and a recessed portion formed on part of these flange portions is fitted and engaged with the outer circumferential surface of the end portion 2 of the driving shaft or the end portion 4 of the driven shaft so that the orientations of the inner slide surface 11 of the guide member 10 and of the inner slide surface 13 of the guide member 12 are set. Incidentally, a plurality (four in the illustrated embodiment) of recessed portions may be previously formed on the flange portion 10a or 12a so that, by taking into account a possible application of the present invention to the shaft couplings having the end portion 2 of the driving shaft or the end portion 4 of the driven shaft of different outer diameter, the curvature of each recessed portion can be made different.

Figure 5:
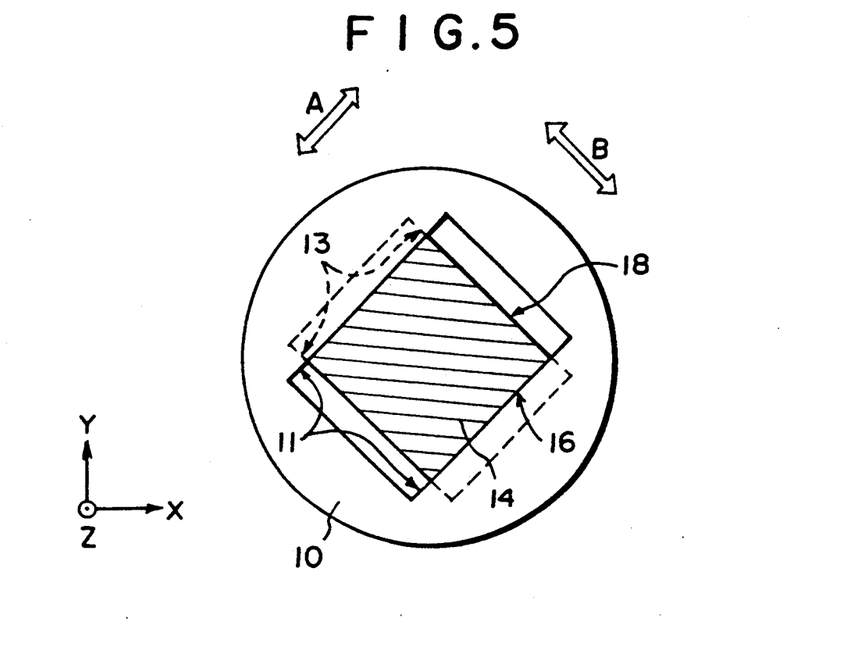
FIG. 5 is a schematic view of the shaft coupling of FIG. 1 illustrating a relationship between the guide member at side of the driving shaft, the guide member at the side of the driven shaft and the torque transmitting rod member, as viewed from the driving shaft side.
Figure 6:
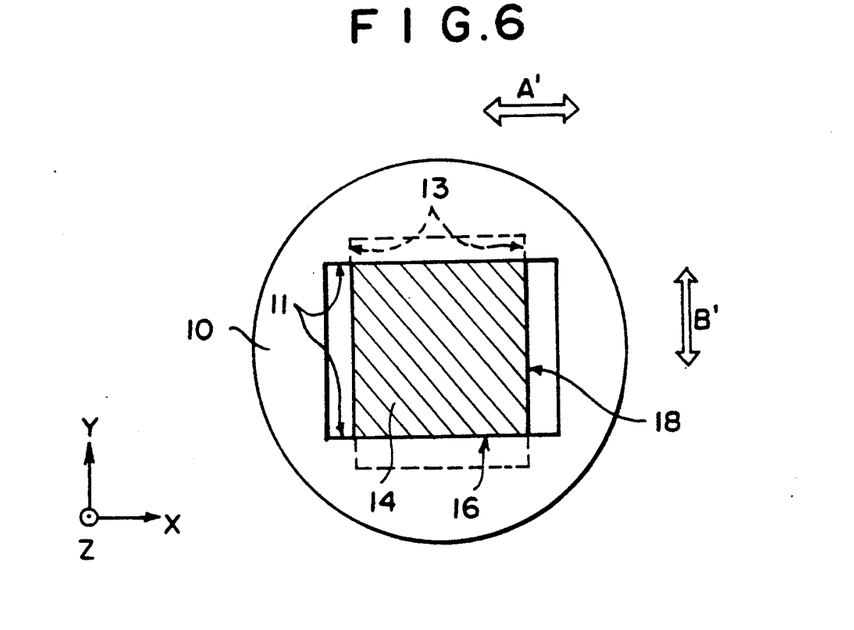
FIG. 6 is a schematic view of the shaft coupling of FIG. 1 illustrating a relationship between the guide member at side of the driving shaft, the guide member at the side of the driven shaft and the torque transmitting rod member, as viewed from the driving shaft side.

FIGS. 5 and 6 each illustrate a relationship between the guide member 10 at the side of the driving shaft, guide member 12 at the side of the driven shaft and the rod member 14, as viewed in the Z direction from the driving shaft side. One shown in FIG. 4 and one shown in FIG. 5 are adjacently arrayed in the circumferential direction.

Referring to FIG. 5, the rod member 14 can be slidably shifted in the direction of arrow A relative to the guide member 10 at the side of the driving shaft and can be also slidably shifted in the direction of arrow B (intersecting at a right angle with the A direction) relative to the guide member 12 at the side of the driven shaft. Referring to FIG. 6, the rod member 14 can be slidably shifted in the direction of arrow A' relative to the guide member 10 at the side of the driving shaft, and can be slidably shifted in the direction of arrow B' (intersecting at a right angle with A' direction) relative to the guide member 10 at the side of the driven shaft. The foregoing A' direction is inclined 45 degrees relative to the foregoing A direction, and the foregoing B' direction is inclined 45 degrees relative to the foregoing B direction. As shown in FIG. 1, the first outer slide surface 16 and the second outer slide surface 18 of the rod member 14 form approximately 45 degrees relative to a plane passing through the rotational axis 2' of the driving shaft or that 4' of the driven shaft and passes through the rod member. That is, the rod member 14 is substantially similarly oriented relative to the rotational axis 2' or 4'.

Incidentally, the rod member 14 may be made of metal, and the slide member 10 at the side of the driving shaft and the slide member 12 at the side of the driven shaft may be made of a plastic material having a proper slidability relative to the metallic material of the rod member, a proper strength and a proper flexibility, such as polyacetal resin or polyamide resin.

Thus, in this embodiment, each rod member 14 can be shifted relative to the flange 6 of the end portion of the driving shaft by being slidably shifted in the A or A' direction and Z direction relative to the guide member 10 at the side of the driving shaft and rotated with the B or B' direction and as its axis, and can be shifted relative to the flange 8 of the end portion of the driven shaft by being slidingly shifted in the B or B' direction and Z direction relative to the guide member 12 at the side of the driven shaft and rotated with A or A' direction as its axis.

In this embodiment, when the end portion 2 of the driving shaft is rotated, the torque is transmitted from each guide member 10 mounted at the flange 6 through the rod member 14 to the flange 8 having the guide member 12 mounted to rotate the end portion 4 of the driven shaft. When any eccentricity, angular deviation or axial movement takes place to the end portion 2 of the driving shaft and the end portion 4 of the driven shaft, it can be effectively coped with by the relative movement between each rod member 14 and each guide member 10 and between each rod member 14 and each guide member 12, as shown. Incidentally, the interval between the end portions 2 and 4 is set so as to allow the expected axial movement. In particular, in this embodiment, since all the rod members 14 take the same orientation relative to the rotational axis 2' of the driving shaft or the rotational axis 4' of the driven shaft, and yet the slide surfaces are all inclined 45 degrees relative to the plane passing through these rotational axes and each transmitting rod member 14, no load is concentrated on a specific transmitting rod member, but the torque is uniformly and smoothly transmitted by means of all the transmitting members 14 providing a good transmitting efficiency.

The foregoing shaft coupling can readily be manufactured by assembling the members as shown in FIG. 1. The rod member 14 and the guide members 10 and 12 can be easily replaced by only disengaging the rod member 14 and the bolt to pull them out toward the driving side or driven side in the Z direction without shifting the end portion 2 at the side of the driving shaft, its flange 6, the end portion 4 of the driven shaft and its flange 8. Thus, these rod member 14, guide members 10 and 12 can be each readily repaired.

In addition, in this embodiment, when as the guide members 10 and 12 ones made of plastic is used, since they exhibit a proper flexibility, the transmission of vibration between the driving shaft side and the driven shaft side can be suppressed, and further the transmission of the rotational force when the load is abruptly changed can be smoothly changed. Further, since it exhibits a self-lubricity in the slidable contact with the rod member 14, it is not necessary to use any lubricating oil, which may ease the maintenance.

Figure 7:
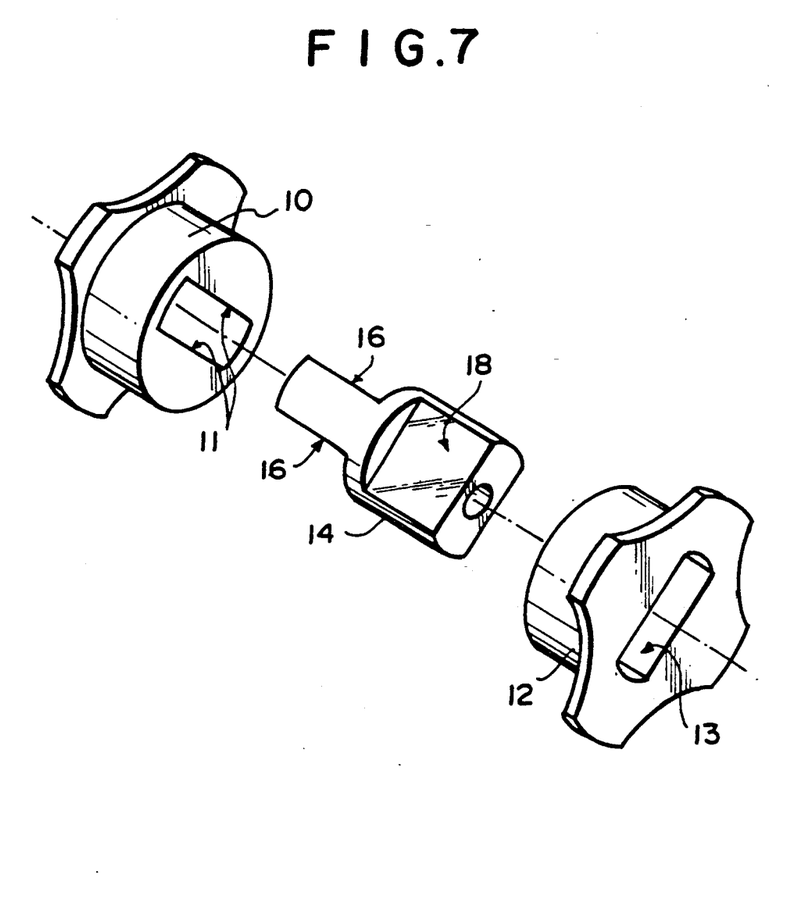
FIG. 7 is a perspective view of a modification of the rod member of the shaft coupling according to the present invention.

FIG. 7 is a perspective view illustrating a modification of the torque transmitting rod member according to the present invention, in which the rod member 14 comprises a plate-like driving side portion and a plate-like driven side portion which is connected to each other intersecting at a right angle with each other. Correspondingly, the cross section of the through hole of the guide members 10 and 12 is thin and long. Therefore, according to the present invention, the area over which the first outer slide surface 16 of the rod member 14 is in contact with the inner slide surface 11 of the guide member 10 and the area over which the second outer slide surface 18 of the rod member 14 is in contact with the inner slide surface 13 of the guide member 12 can be made greater than that of the foregoing embodiment so that a greater torque can be transmitted.

As described above, according to the present invention, there may be provided a novel shaft coupling which can effectively cope with the eccentricity, angular deviation and the axial movement between the driving shaft side and the driven shaft side and and which is easy in repair and assembly. Further, according to the present invention, a shaft coupling which allows the torque to be smoothly transmitted with a high efficiency and is easy in maintenance can be provided.

What is claimed is:

1. Shaft coupling for coupling a driving shaft and a driven shaft, in which:
    a driving side mount member attachable to the driving shaft and a driven side mount member attachable to the driven shaft are disposed in an opposed manner;
    on the driving side mount member, a flange is attached, through which a plurality of through holes running parallel to a rotational axis of the driving shaft are arrayed in the circumferential direction, to each of which a driving side guide member is removably mounted, on which a pair of driving side inner slide surfaces running parallel to each other are formed;
    on the driven side mount member, a flange is attached, through which a plurality of through holes running parallel to a rotational axis of the driven shaft are arrived in the circumferential direction, to each of which a driven side guide member is removably mounted, on which a pair of driven side inner slide surfaces running parallel to each other are formed; and
    a plurality of torque transmitting rod members each penetrate both a corresponding one of said driving side guide members and a corresponding one of said driven side guide members in an axial direction, said rod members each having both a pair of first outer slide surfaces slidable relative to said pair of driving side inner slide surfaces and a pair of second outer slide surfaces slidable relative to said pair of driven side inner slide surfaces, said second outer slide surfaces being not parallel to said first outer slide surfaces, said rod members each being removable in the axial direction relative to the corresponding one of the driving side guide members and the corresponding one of the driven side guide members.

2. Shaft coupling as set forth in claim 1 wherein, for each of said rod members, a first angle which the first outer slide surfaces form with a plane passing through the rotational axis of at least one of the driving and driven shafts and passing through a center of the rod member is substantially equal to a second angle which the second outer slide surfaces form with said plane.

3. Shaft coupling as set forth in claim 2 wherein the first angle and the second angle are set to approximately 45 degrees.

4. Shaft coupling as set forth in claim 1 wherein a flange portion attached to said driving side guide member is made to abut an outer circumferential surface of the driving side mount member to set an orientation of the driving side inner slide surfaces, and a flange portion attached to said driven side guide member is made to abut an outer circumferential surface of the driven side mount member to set an orientation of the driven side inner slide surfaces.

5. Shaft coupling as set forth in claim 1 wherein said first outer slide surfaces and said second outer slide surfaces are each made of metal, and said driving side inner slide surfaces and said driven side inner slide surfaces are each made of plastic.

6. Shaft coupling as set forth in claim 1 wherein, for each of said rod members, each of said first outer slide surfaces intersects each of said second outer slide surfaces at a right angle.

7. Shaft coupling as set forth in claim 6 wherein, for each of said rod members, a cross section within a plane which intersects the longitudinal direction at a right angle is of square form.

8. Shaft coupling as set forth in claim 6 wherein, for each of said rod members, both said first and second outer slide surfaces form an angle of about 45 degrees relative to a plane passing through the rotational axis of at least one of the driving and driven shafts and passing through a center of the rod member.

* * * * *

UNITED STATES PATENT AND TRADEMARK OFFICE
CERTIFICATE OF CORRECTION

PATENT NO. : 5,324,234
DATED      : June 28, 1994
INVENTOR(S): Sadatomo Kuribayashi It is certified that error appears in the above-identified patent and that said Letters Patent is hereby corrected as shown below:

Claim 1, column 6, line 41, delete "arrived" and insert --arrayed--.

Signed and Sealed this

First Day of November, 1994

Attest:

BRUCE LEHMAN

Attesting Officer

Commissioner of Patents and Trademarks